United States Patent [19]
Miyata et al.

[11] Patent Number: 5,208,044
[45] Date of Patent: May 4, 1993

[54] VULCANIZING MOLD

[75] Inventors: Mitsuki Miyata; Yasunori Ueda, both of Kobe, Japan

[73] Assignee: Sumitomo Gomu Kogyo Kabushiki Kaisha, Kobe, Japan

[21] Appl. No.: 582,855

[22] PCT Filed: Feb. 13, 1990

[86] PCT No.: PCT/JP90/00175

§ 371 Date: Oct. 15, 1990

§ 102(e) Date: Oct. 15, 1990

[87] PCT Pub. No.: WO90/09268

PCT Pub. Date: Aug. 23, 1990

[30] Foreign Application Priority Data

Feb. 15, 1989 [JP] Japan ................... 1-35297
Oct. 18, 1989 [JP] Japan ................. 1-271382

[51] Int. Cl.$^5$ .................. B29C 35/02; B29C 43/36
[52] U.S. Cl. ........................ 425/32; 425/46; 425/55
[58] Field of Search ............. 425/28.1, 47, 54, 57, 425/32, 46, 47, 19

[56] References Cited

U.S. PATENT DOCUMENTS

| | | | |
|---|---|---|---|
| B. 485,169 | 3/1976 | Tippin | 425/47 |
| 3,479,693 | 11/1969 | Cantarutti | 425/47 |
| 3,505,447 | 4/1970 | Billes | 425/47 |
| 3,778,203 | 12/1973 | MacMillan | 425/DIG. 5 |
| 3,897,181 | 7/1975 | Madaschefsky | 425/47 |
| 4,013,390 | 3/1977 | Moeller et al. | 425/47 |
| 4,022,554 | 5/1977 | MacMillan | 425/46 |
| 4,025,250 | 5/1977 | MacMillan | 425/DIG. 5 |
| 4,181,482 | 1/1980 | Grawey et al. | 425/46 |
| 4,289,463 | 9/1981 | LeMoullac | 425/47 |
| 4,563,139 | 1/1986 | Yokoyama et al. | 425/47 |
| 4,580,959 | 4/1986 | Pissorno et al. | 425/47 |
| 4,686,129 | 8/1987 | Yokoyama et al. | 425/47 |
| 4,726,749 | 2/1988 | Katsumata | 425/47 |

FOREIGN PATENT DOCUMENTS

| | | |
|---|---|---|
| 1901130 | 7/1970 | Fed. Rep. of Germany . |
| 2000796 | 7/1971 | Fed. Rep. of Germany ........ 425/46 |
| 2301310 | 7/1974 | Fed. Rep. of Germany . |
| 2309410 | 8/1974 | Fed. Rep. of Germany ........ 425/47 |
| 2502185 | 6/1981 | Fed. Rep. of Germany . |
| 47-21838 | 6/1972 | Japan . |
| 533985 | 6/1976 | Japan . |
| 58-211438 | 8/1983 | Japan . |
| 1248891 | 10/1971 | United Kingdom . |

OTHER PUBLICATIONS

Mnan, Websters. "New Collegiate Dictionary" Merrian, Springfield, Mass., (1976) p. 365 Relied On.

*Primary Examiner*—Willard Hoag

[57] ABSTRACT

The vulcanizing mold has an upper mold member, a lower mold member, a sector surrounding the space between the upper and lower mold members and an actuator movable upward and downward relative to the sector to move the sector radially outward and inward. The actuator is divided into an upper actuator portion and a lower actuator portion. The sector is also divided into an upper sector portion and a lower sector portion. The mold further has a connection for connecting the actuator portions together to raise the lower actuator portion by a predetermined amount with the rise of the upper actuator portion and for separating the lower actuator portion from the upper actuator portion upon the portion rising more than the predetermined amount, when the mold is opened.

13 Claims, 11 Drawing Sheets

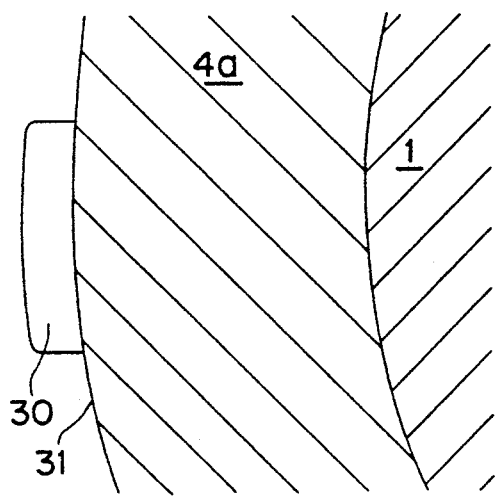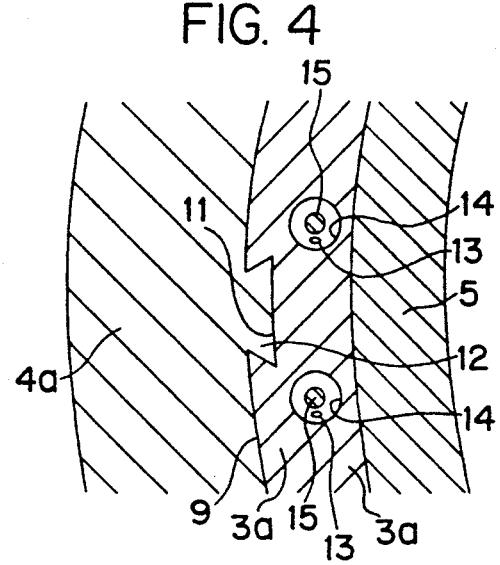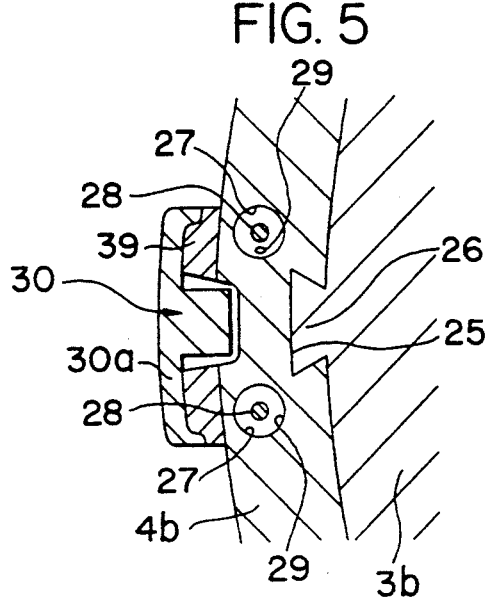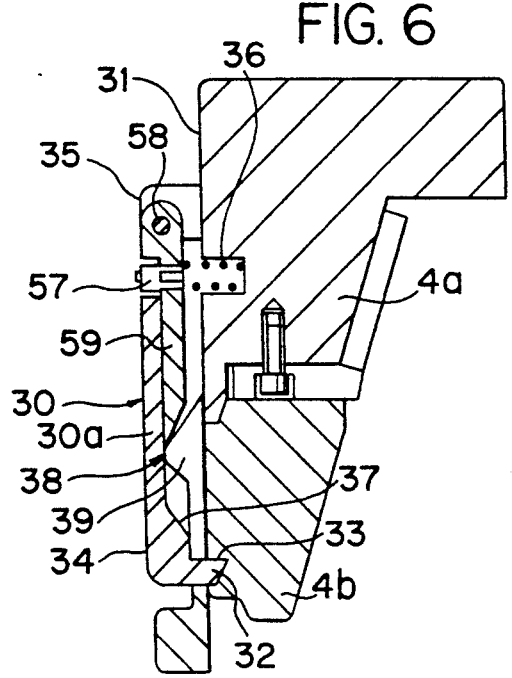

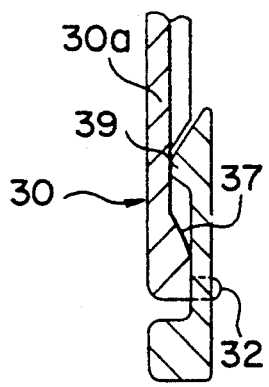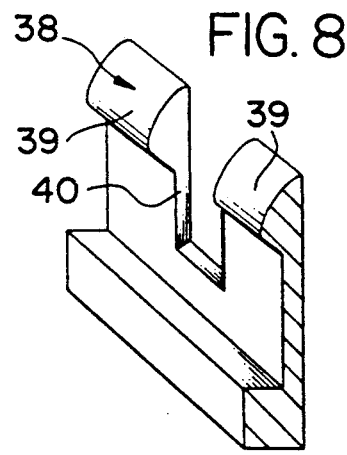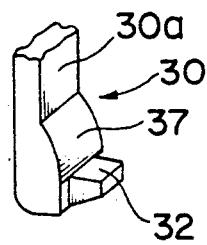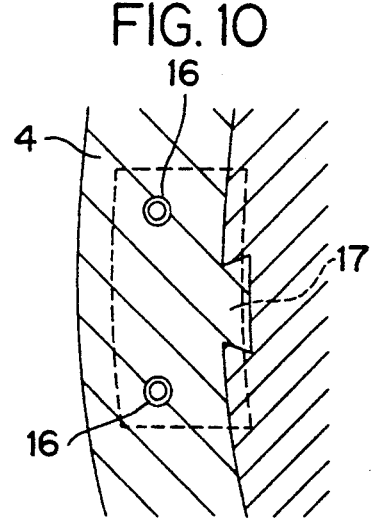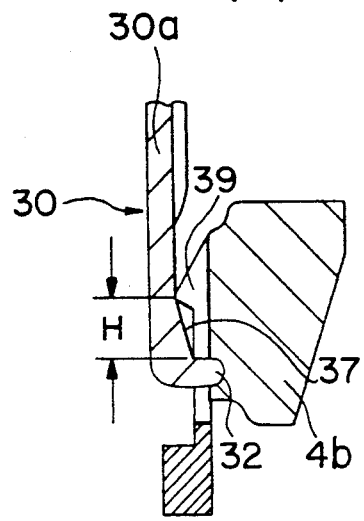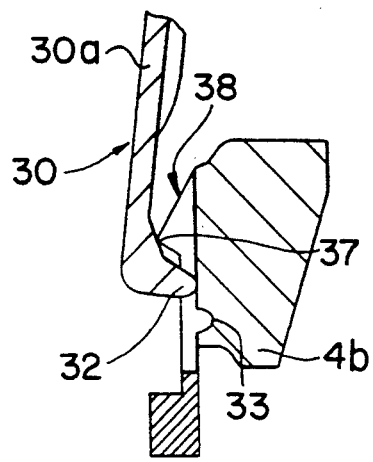

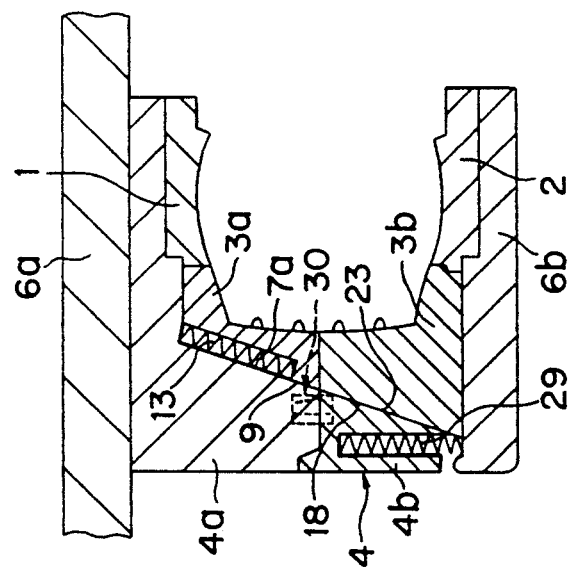
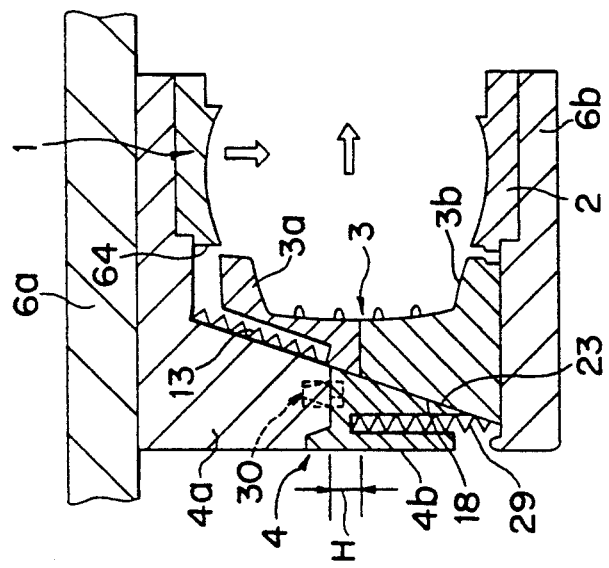
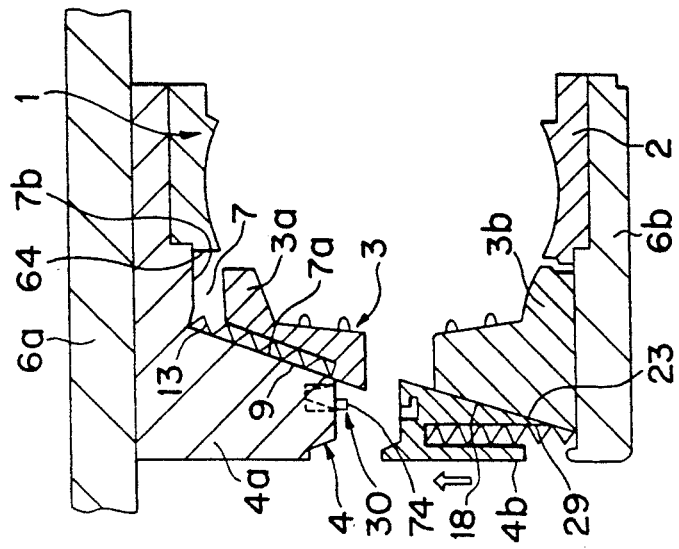

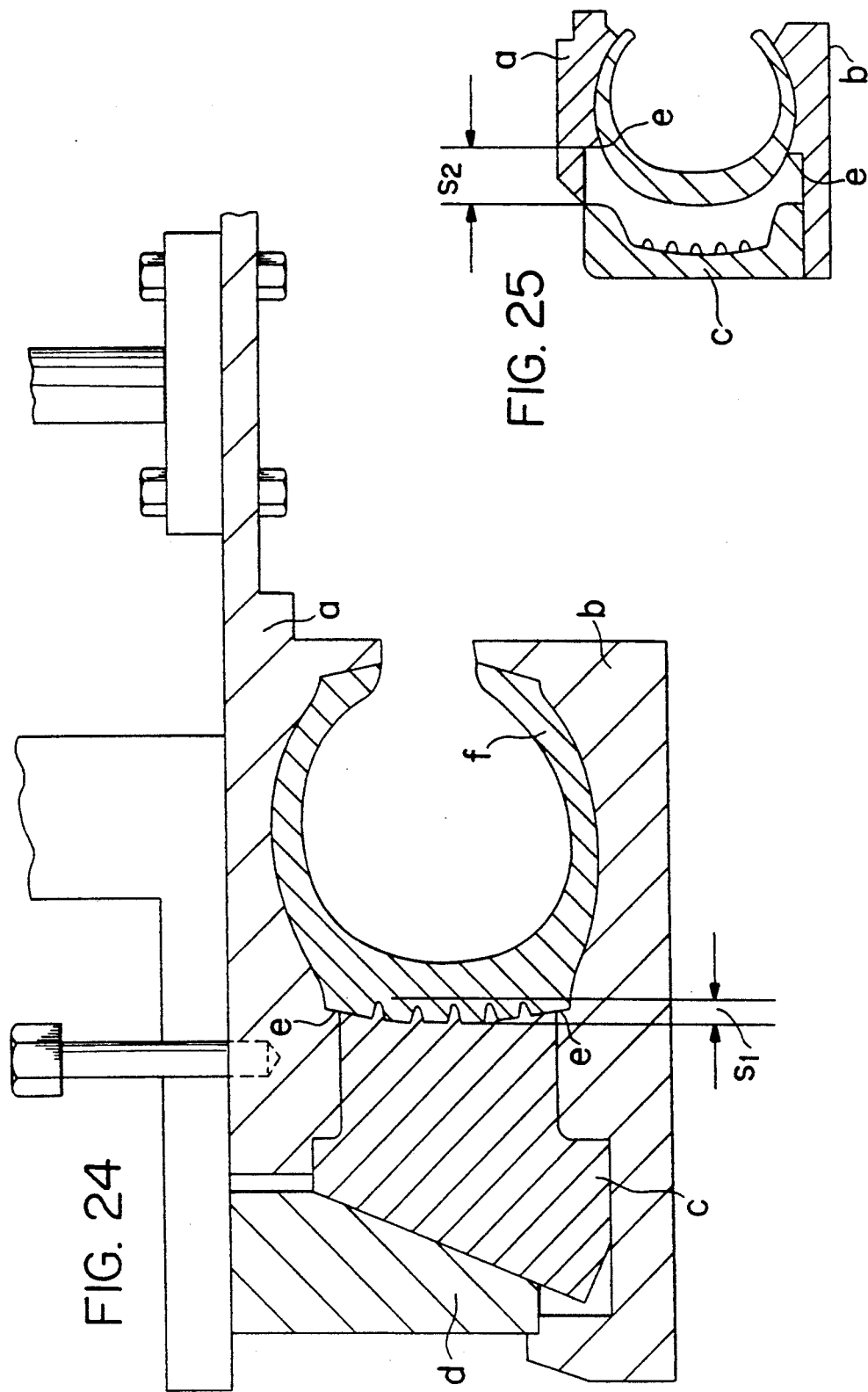

VULCANIZING MOLD

TECHNICAL FIELD

The present invention relates to vulcanizing molds, and more particularly to split vulcanizing molds for tires.

BACKGROUND ART

FIG. 24 shows a conventional example, i.e., a segmental vulcanizing tire mold, which comprises a fixed lower mold b corresponding to one side wall of a tire, a movable upper mold a movable upward and downward relative to the fixed lower mold b, and a sector c interposed between the molds and corresponding to the tread of the tyre tire f. Needless to say, these members are all annular. The sector c comprises a plurality of segmental blocks arranged circumferentially so as to be easily removable from the tire tread having a pattern of indentations or projections. When an actuator d is raised upon completion of vulcanization, the sector c automatically moves horizontally outward out of contact with the tread of the tire f. When the actuator is further raised, the sector c moves upward therewith. More specifically, each segmental block of the sector c is in engagement with the actuator d at a slide portion extending obliquely downward so as to be horizontally movable outward with the raising of the actuator d. Furthermore, the sector c is pressed on, for example, by the upper mold a so as not to raise until the sector c moves completely out of contact with the tread of the tire f, the sector being upwardly movable only after it has been removed from the tread.

As seen in FIG. 24, when the sector c is adapted to be separated from the upper and lower molds a, b at positions e on the tread surface, the distance the sector c needs to be slidingly moved radially of the tire (so as to be movable upward without contacting the tire tread) can be as short as S1. However, in the case of such separating positions, a stepped portion is likely to occur at the tread surface, or if the separating position coincides with a pattern groove, a crack will develop. If the separating positions are provided on the tire side walls as shown in FIG. 25, an increased sliding distance S2 is required to result in the size of molds becoming larger.

On the other hand, for use with segmental vulcanizing molds for curing retreaded tires, a sector is known which is divided into upper and lower pieces biased by springs or like elastic member and movable into contact with each other by a closing action of a press to close the sector. With this arrangement, the elastic members each have inherent rigidity or become different from each other in rigidity during use, so that the biasing forces of the elastic members are not always the same. Consequently, when the molds are to be closed, the respective divided pieces will not always move from the regular position to upwardly or downwardly shift the parting line of the upper and lower sector pieces, or the sector pieces are likely to move radially (for closing) as displaced from each other, failing to move in synchronism. This entail the drawback that the center (equator) of the tire is positioned off the center of the mold assembly to impair the uniformity of the tire. Further because the sector is opened or closed not horizontally but obliquely, it is impossible to give a great raw cover stretch which is an advantage of the segmental mold (advantage that the raw tire can be made approximate to the finished tire in outside diameter).

DISCLOSURE OF THE INVENTION

Accordingly, an object of the present invention is to provide a vulcanizing segmental mold which is compacted for use with a sector which is separated from each of upper and lower mold members at a position set as desired without being limited by the sliding distance of the sector, the mold being adapted to vulcanize a tire without permitting the tire equator to be off the center of the mold so as to assure the tire of uniformity.

To fulfill the object, the present invention provides a vulcanizing mold comprising upper and lower mold members, a sector, and an actuator disposed radially outwardly of the sector, the actuator being divided into an upper actuator portion and a lower actuator portion which are movable upward and downward relative to the sector, the sector being divided into an upper sector portion radially slidable in contact with the upper actuator portion for opening and closing by the relative upward and downward movement of the upper actuator portion, and a lower sector portion radially slidable in contact with the lower actuator portion for opening and closing by the relative upward and downward movement of the lower actuator portion.

With the mold of the invention thus constructed, the sector is divided into the upper and lower portions, so that when the mold is to be opened, there is no need to raise the lower sector portion clear of the tire tread. As a result, the sliding distance required of the sector can be a minimum (equal to the depth of the tread pattern grooves). Furthermore, the position where the sector is to be separated from each of the upper and lower mold members can be provided at a position optimum for the tire performance, i.e., on the tire side wall, as desired without being limited by the sliding distance.

More specifically, the mold of the invention has means for pushing the lower actuator portion upward, and means for pushing the upper sector portion downward. Alternatively, the mold has means for pushing the upper actuator portion downward, and means for pushing the lower sector portion upward.

With this specific arrangement, only one of the sector portions is pushed by the pushing means, so that the parting line between the upper and lower sector portions will not shift upward or downward, permitting these portions to radially slide along at the same level at all times to close the mold. Further the upper and lower sector portions are thus slidingly movable radially at the same time without any lag with respect to each other.

The pushing means comprises an elastic member such as a spring, air cylinder or the like.

More specifically, the mold of the invention has the following features.

A stopper is provided for holding the upper sector portion to prevent this portion from descending more than a predetermined amount relative to the upper actuator portion.

The upper actuator portion has a tapered inner peripheral surface formed with ridges or grooves extending upward or downward and arranged at a predetermined spacing circumferentially thereof.

The upper sector portion has an outer surface tapered with the same inclination as the inner peripheral surface of the upper actuator portion and formed with grooves or ridges slidably fitting to the ridges or grooves in the manner of a dovetail joint.

The lower actuator portion has an inner peripheral surface which is tapered with the same inclination as the inner peripheral surface of the upper actuator portion and which is formed with ridges or grooves extending upward or downward and arranged at a predetermined spacing circumferentially thereof.

The lower sector portion has an outer surface tapered with the same inclination as the inner peripheral surface of the lower actuator portion and formed with grooves or ridges slidably fitting to the ridges or grooves in the manner of a dovetail joint.

The divided joining faces of the upper and lower sector portions are each formed with a positioning indentation or projection.

The mold of the present invention, which is constructed as above, has the following advantages.

The position where the sector is separated from each of the upper and lower mold members can be determined as desired without being limited by the sliding distance of the sector. More specifically, the position can be provided on the tire side wall, i.e., at a position optimum from the viewpoint of tire performance. Nevertheless, the sector sliding distance can be a minimum as in the case where the separating position is provided on the tread side. In other words, the distance can be made equal to the depth of the tread pattern grooves as will be apparent from the embodiment to be described. The mold can therefore be compact.

The position of the parting line between the upper and lower sector portions does not alter upward or downward when the mold is closed, permitting these sector portions to move radially while being maintained at the same level. Moreover, since the upper and lower sector portions slide along in synchronism with each other in the same direction, the tire can be vulcanized with its equator positioned at the center of the mold. This provides vulcanized molded products with good stability at all times. Since one of the sector portions and one of the actuator portions need only to be held by spring or elastic members, the overall arrangement and mechanism can be simplified, with the mold designed as compacted. With the mold thus compacted, the press to be used can also be of a small size, hence a very low manufacturing cost.

According to the present invention, the actuator is divided into upper and lower portions, which therefore need to be moved in synchronism. With the present invention, therefore, the upper and lower actuator portions are moved together by a predetermined amount and are thereafter separated. More specifically stated, the mold of the present invention is provided with means for releasably connecting the upper actuator portion and the lower actuator portion together and releasing the lower actuator portion from the upper actuator portion when these portions are raised by a predetermined amount from the mold clamping position at a lower level.

The connecting means comprises a hanging member pivotally movably provided on one of the upper and lower actuator portions and projecting toward the other actuator portion with an engaging portion formed at the projecting end, and an engageable portion provided on the other actuator portion and releasably engageable by the engaging portion when the upper and lower actuator portions are intimately fitted together; means for biasing the hanging member toward a direction in which the engaging portion engages with the engageable portion; and release member attached to the lower mold member for pivotally moving the hanging member against the biasing means to release the engaging portion from the engageable portion when the release member is moved vertically relative to the hanging member.

Alternatively, the connecting means comprises a hook member movably supported by a horizontal pivot provided inside the upper actuator portion and having a lower end projecting beyond the lower surface of the upper actuator portion; an engaging portion provided at the upper end of the lower actuator portion and releasably engageable with a hook portion at the forward end of the hook member when the upper actuator portion is in intimate contact with the lower actuator portion; an elastic member for biasing the hook member hook portion radially inward to engage the hook portion with the engaging portion when the upper actuator portion is in intimate contact with the lower actuator portion; and a pushing portion provided on the upper sector portion and movable into contact with a portion of the hook member to push the hook portion thereof radially outward against the force of the elastic member and release the hook member from the engaging portion when the mold is in its opened state with the upper actuator portion raised to slightly lower the upper sector portion relative thereto.

The connecting means of the type having the hook member operates as follows. When the upper actuator portion is raised while the mold is in its completely closed state (wherein the upper actuator portion and the lower actuator portion are in intimate contact with each other, with the hook member hook portion in engagement with the engaging portion), the lower actuator portion is hung up by the hook member and raised along with the upper actuator portion, with the upper sector portion lowered relative to the actuator, and the pushing portion (dovetail grooved end portion) of the upper sector portion radially outwardly pushes the hook portion of the hook member out of engagement with the engaging portion to separate the upper actuator portion from the lower actuator portion.

Conversely, to completely close the mold from the state (fully opened state) wherein the upper and lower actuator portions are separate, the upper actuator portion is lowered to bring the upper sector portion into contact with the lower sector portion and cause the upper actuator portion to push down the lower actuator portion, whereby the upper and lower sector portions are radially moved first for the hook portion to engage with the engaging portion.

According to the above construction, as various members are not disposed at an outer peripheral surface of a mold, the entirely to the mold can be compact and has a good appearance. More specifically, a hook member, a socket member forming an engaging portion, an elastic member and a block or the like forming a pushing portion can be constructed as a single article. Furthermore, the single articles are easy to attach or detach and have an advantage of favorable maintenance.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3 is a view in section taken along the line 3—3 in FIG. 1;

FIG. 4 is a view in section taken along the line 4—4 in FIG. 1;

FIG. 5 is a view in section taken along the line 5—5 in FIG. 1;

FIG. 6 is a sectional view showing upper and lower actuator portions;

FIG. 7 is a sectional view of a hanging member and a release member;

FIG. 8 is a perspective view schematically showing the release member;

FIG. 9 is a fragmentary perspective view schematically showing the hanging member;

FIG. 10 is a view in section taken along the line 10—10 in FIG. 1;

FIGS. 11(a) and 11(b) are views illustrating the operation of the hanging member;

FIGS. 16(a), 16(b) and 16(c) are diagrams in section for illustrating how the mold is opened and closed;

FIG. 24 is a fragmentary sectional view of a conventional example; and

FIG. 25 is a fragmentary sectional view of a conventional example.

BEST MODE OF CARRYING OUT THE INVENTION

Embodiments will be described below with reference to the drawings.

Figure 1:
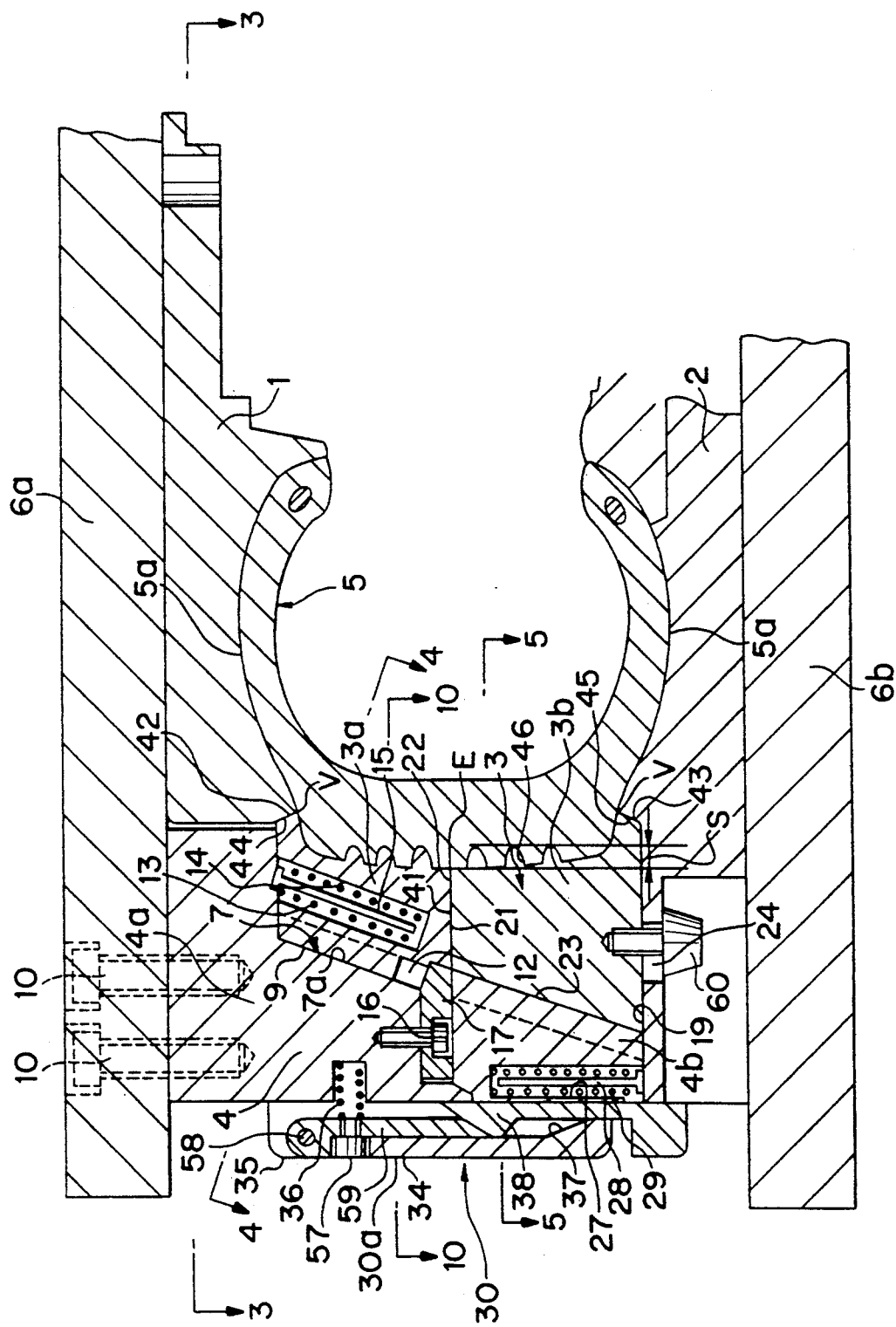
FIG. 1 is a fragmentary view in section showing a vulcanizing mold embodying the invention in its completely closed state.
Figure 2:
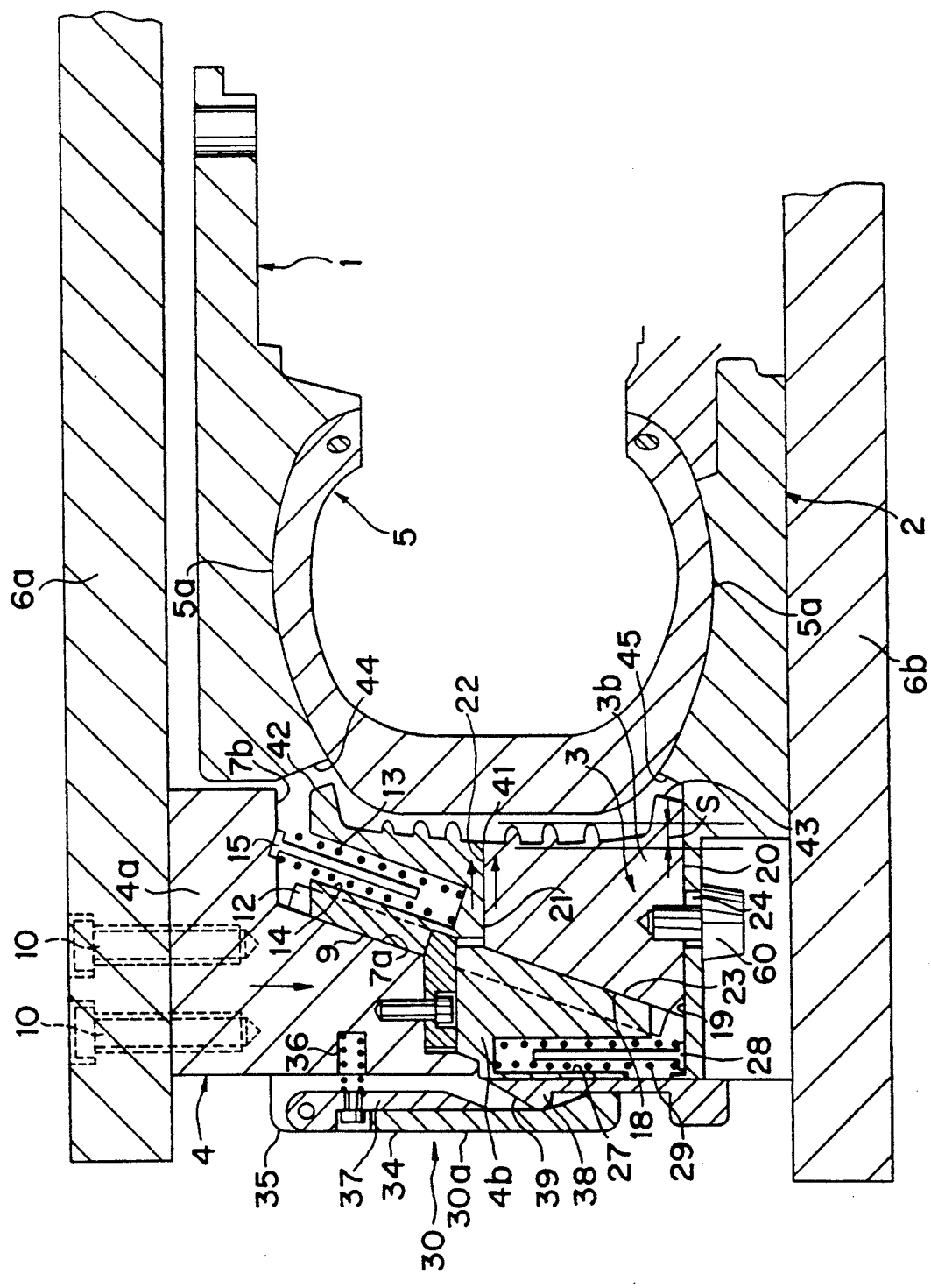
FIG. 2 is a fragmentary view in section of the same in an opened state.

FIGS. 1 and 2 show a vulcanizing mold according to the present invention. The mold comprises upper and lower mold members 1, 2, a treadmold sector 3, and an actuator (or tapered ring has 4 disposed radially outward of the sector 3 for vulcanizing a tire 5 or like elastomeric products. The sector 3 comprises a plurality of segmental blocks in an annular arrangement.

The actuator 4 is divided into an upper actuator portion (or tapered ring half) 4a and a lower actuator portion (or tapered ring half) 4b which are movable upward and downward relative to the sector 3. The sector 3 is also divided into an upper tread mold sector portion 3a and a lower tread mold sector portion 3b.

The upper actuator portion 4a is annular, is secured to an upper platen 6a with bolts or like fastening members 10 and has an inner periphery formed with a circumferential recess 7. The inner peripheral surface 7a forming the recess 10 is so tapered that it flares radially outward downward. The surface 7a is formed with upward or downward ridges 12.

Each divided block of the upper sector portion 3a is fittable in the recess 7 of the upper sector portion 4a and has a tapered outer surface 9 which is slidable in contact with the inner peripheral surface 7a defining the recess 7. As seen in FIG. 4, the outer surface 9 has a groove 11 for the ridge 12 to fit in upwardly and downwardly slidably. The groove 11 is a dovetail groove, in which the ridge 12 is fitted in to provide a dovetail joint.

The upper sector portion 3a is pusheddownward by pushing means. More specifically, each divided block of the upper sector 3a is pushed downward at all times by spring members 13, such as coiled springs, attached to the upper actuator 4a. (Thus, the block is pushed down.) With reference to FIG. 4, the upper sector 3a is formed with a pair of blind bores 14, 14. Support rods 15, 15 inserted in the respective bores 14, 14 are pressed against the recessed upper surface 7b of the upper actuator 4a by the spring members 13 which are inserted concentrically with the rods. The axes of the bore 14 and the support rod 15 are disposed at the same angle of inclination as the inner peripheral surface 7a of the circumferential recess 7 of the upper actuator 4a and the outer surface 9 of the upper sector portion 3a. The biasing means is not limited to the spring member 13 but may be an air cylinder or the like.

A stopper 17 (see FIG. 10) in the form of a flat plate is secured by bolts or like fastening members 16 to the lower surface of the upper actuator portion 14a. Accordingly, the upper sector portion 3a is prevented from falling by contact with the stopper 17 as seen in FIG. 2.

Each block of the lower sector portion 3b has a slanting outer surface 18 the same as the outer surface 9 of the upper sector 3a and a lower surface 20 slidable on a horizontal surface portion 19 of the lower member 2 and is mounted on the lower mold member 2. The lower mold member 2 is attached to a lower platen 6b. A bolt 60 slidably attaches the a lower sector portion 3b to the lower mold member 2 through a slot 24.

The lower actuator portion 4b is annular and has an inner peripheral surface 23 in the form of the same slanting surface as the inner peripheral surface 7a of the upper actuator portion 4a. The surface 23 is slidable in contact with the outer surface 18 of the lower sector portion 3b. As shown in FIG. 5, grooves 25 extending upward or downward are formed in the inner peripheral surface 23 of the lower actuator portion 4b. Ridges 26 are formed on the outer surface 18 of the lower sector portion 3b and fitted in the grooves 25 slidably in the manner of dovetail joints.

The lower actuator portion 4b is pushed upward by pushing means. More specifically, the lower actuator portion 4b is always pushed upward by spring members 29, such as coiled springs, attached to the lower mold member 2. As shown in FIG. 5, a plurality of vertical blind bores 27 are formed in the lower actuator portion 4b and arranged circumferentially thereof. A support rods 28 interested in the respective bores 27 are fixed to the lower mold member 2. The spring members 29 as supported by the respective rods 28 are inserted in the respective bores 27.

The upper actuator portion 4a is provided with connecting means 30 for lifting the lower actuator portion 4b in suspension. As seen in FIG. 3, the connecting means 30 has a plurality of hanging members 30a provided on the outer peripheral surface 31 of the upper actuator portion 4a and arranged circumferentially thereof. As shown in FIG. 6, each hanging member 30a has at its forward end a latch 32 releasably engageable in a notch 33 in the lower actuator portion 4b. More specifically, the handing member 30a comprises a main portion 34 having the latch 32 at its forward end, a connecting portion 59 connected to the main portion 34, and a support portion 35 for pivotally movably supporting the connecting portion 59 on the outer surface 31 of the upper actuator portion 4a. The connecting portion 59 is pulled toward the upper actuator portion 4a by a spring member 36. Indicated at 57 is a connector for connecting the main portion 34 to the connecting portion 59, and at 58 a pin. As shown in FIG. 9, the main portion 34 is formed with a protuberance 37 on the inner side of its lower end, with the latch 32 projecting horizontally from the lower extremity of the protuberance 37.

With reference to FIG. 8, the outer periphery of the lower mold member 2 is provided with a release member 38 for releasing the latch 32 of the hanging member 30a from the notch 33. More specifically, the release member 38 has projections 39 for sliding contact with the protuberance 37, and a slot 40 between the projections 39, 39 for the latch 32 to be inserted therein upwardly and downwardly movably.

Accordingly, when the upper actuator portion 4a rises with the rise of the upper platen 6a from the state shown in FIG. 6 (wherein the latch 32 is engaged in the notch 33), the latch 32 rises in the slot 40, lifting the lower actuator 4b therewith as shown in FIG. 11, (a). When the portion 4a further rises from the state of FIG. 11, (a) a distance H (i.e., the height of the protuberance 37), the protuberance 37 moves sliding over the projections 39, releasing the latch 32 from the notch 33 as seen in FIG. 11, (b). The lower actuator portion 4b is thereafter held supported by being pushed upwardly by the spring members 29.

Figure 12:
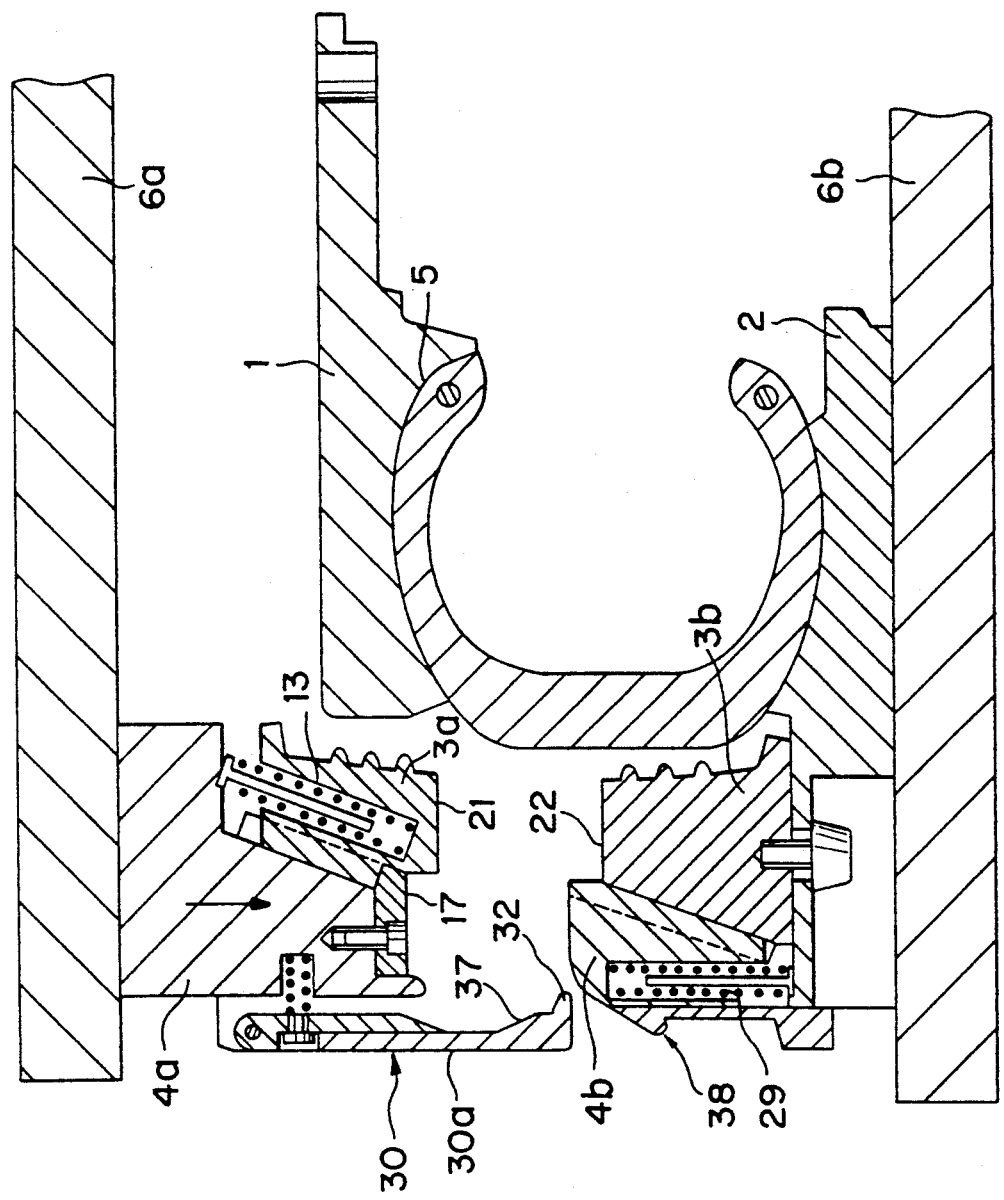
FIG. 12 is a fragmentary view in section showing the mold in its fully opened state.

When a raw tire 5 is to be vulcanized using the mold, the tire 5 is placed on the lower mold member 2 as seen in FIG. 12, and the upper platen 6a is thereafter lowered, whereby the latch 32 of each hanging member 30a is brought to the state of FIG. 11,(b), then to the state of FIG. 11, (a) and thereafter to the state shown in FIG. 2. At the same time, the lower surface 21 of the upper sector portion 3a comes into contact with the upper surface 22 of the lower sector portion 3b, and the upper actuator portion 4a depresses the lower actuator portion 4b. With a further downward movement of the upper platen 6a from the state shown in FIG. 2, the upper actuator portion 4a further lowers in the direction of arrow shown, and the lower actuator portion 4b also moves down in the direction of arrow shown by being pushed by the upper actuator portion 4a. The upper sector portion 3a and the lower sector portion 3b slidingly move in the radial direction at the same time as indicated by arrows.

The parting line 41 between the lower surface 21 of the upper sector portion 3a and the upper surface 22 of the lower sector portion 3b is in coincidence with the equator E of the tire 5. When the sector portions 3a, 3b slide along, the parting line 41 moves radially of the mold at the same level as the equator. As another embodiment, the parting line can of course be positioned off the tire equator. Regardless of the position of the parting line, the upper and lower sector portions are movable radially inwardly of the mold when the mold is closed without upward or downward shift of the parting line.

When the upper platen 6a comes into contact with the upper mold member 1 as seen in FIG. 1, the upper inner edge 42 of the upper sector portion 3a comes into contact with the lower outer edge 44 of the upper mold member 1, and the lower inner edge 43 of the lower sector portion 3b with the inner edge 45 of horizontal surface portion 19 of the lower mold member 2. The mold is thus completely closed.

Accordingly, the sector 3 is separate from the upper and lower mold members 1, 2 at positions indicated at V in FIG. 1. Thus, the position of separation, V, can be on the tire side walls. Further the sliding distance S required of the sector 3 for opening the mold can be a minimum (corresponding to the depth of the tread pattern grooves 46).

When the upper platen 6a is raised after vulcanization, the upper actuator portion 4a is raised, and the lower actuator portion 4b is raised since the latch 22 of each hanging member 30a is engaged in the notch 33. Consequently, the upper and lower sector portions 3a, 3b slide along by the distance S radially outwardly of the mold to the position shown in FIG. 2. In the state of FIG. 2, the hanging member 30a is in the state of FIG. 11, (a). When the hanging member 30a further is raised from this state with the raising of the upper platen 6a, the member 30a is brought to the position shown in FIG. 11, (b), releasing the latch 32 from the notch 33. The opened actuator 4b is held pushed up by the spring members 29. Thus, the mold is fully opened with the vulcanized tire 5 left therein.

Figure 13:
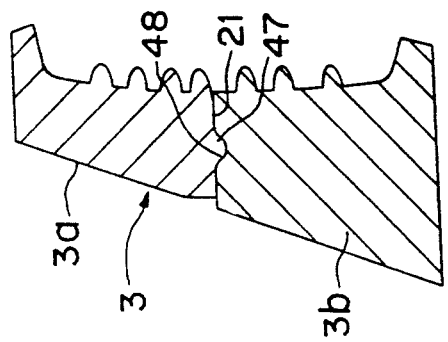
FIG. 13 is a sectional view of modified sector.

FIG. 13 shows modified upper and lower sector portions 3a, 3b. A projection 47 is formed on the lower surface 21 of the upper sector portion 3a, and the upper surface 22 of the lower sector portion 3b is formed with a groove 48 for the projection 47 to fit in.

Accordingly, the upper and lower sector portions 3a, 3b are slidable in the same direction at the same time.

Figure 14:
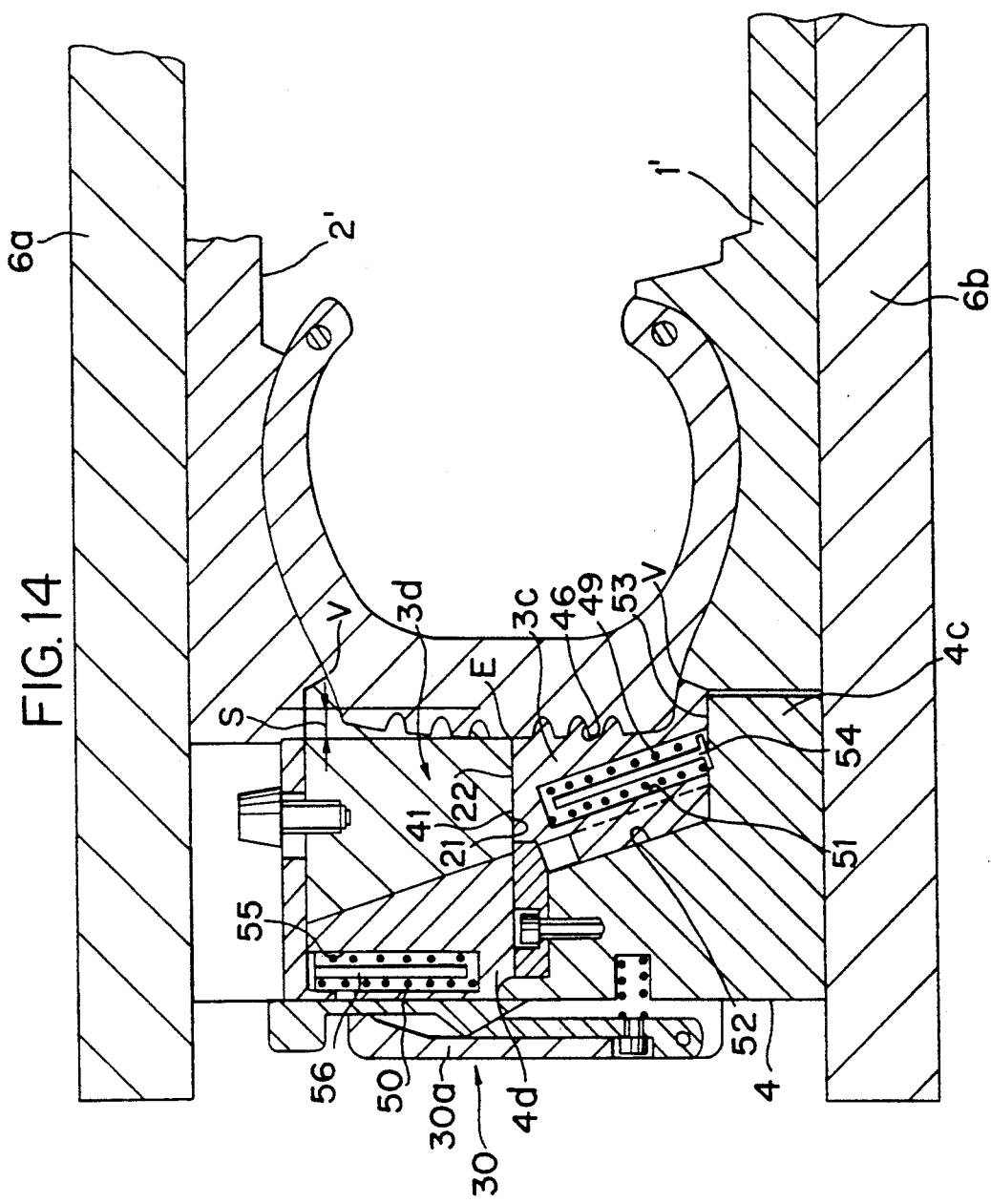
FIG. 14 is a fragmentary view in section of another embodiment.

Next, FIG. 14 shows another embodiment which comprises a spring member 49 for upwardly pushing the sector portion 3d which corresponds to the inverted lower sector portion 3b, and a spring 50 for downwardly pushing the actuator portion 4d which is the inverted lower actuator portion 4d. More specifically, the sector portion 3c is formed with a slanting blind bore 51, and a support rod 54 inserted in the bore 51 is secured to a lower surface 53 defining an inner circumferential recess 52 in the actuator portion 4c. The spring member 49 is inserted as supported by the rod 54 in the bore 51. The actuator portion 4d has a vertical blind bore 55, a support rod 56 inserted in the bore 55 is secured to the upper mold member 2' (which corresponds to lower mold member 2 in the arrangement shown in FIG. 1). The inserted and supported by the rod 56 in the bore 55.

The present embodiment corresponds to the mold of FIG. 1 as turned upside down, so that the other portion thereof will not be described in detail.

Accordingly, the sector 3 is separate from the upper mold member 2' and lower mold member 1' at positions V which can be on the tire side walls 5a also in this case. Moreover, the sliding distance S required of the sector 3 can be a minimum corresponding to the depth of tread pattern grooves 46. With the tire equator positioned centrally of the mold, there is no likelihood of impairing the uniformity of the tire.

Figure 15:
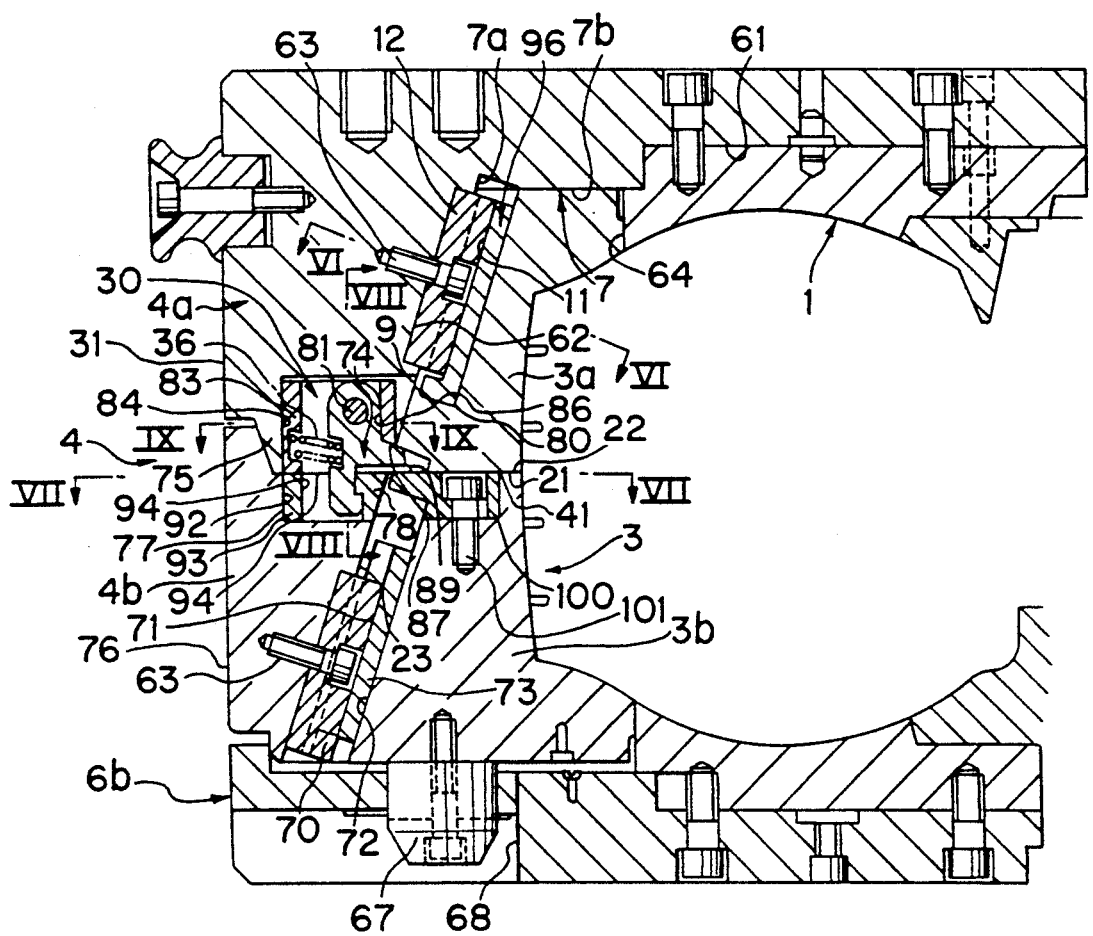
FIG. 15 is a fragmentary view in section of yet another embodiment of the invention.
Figure 20:
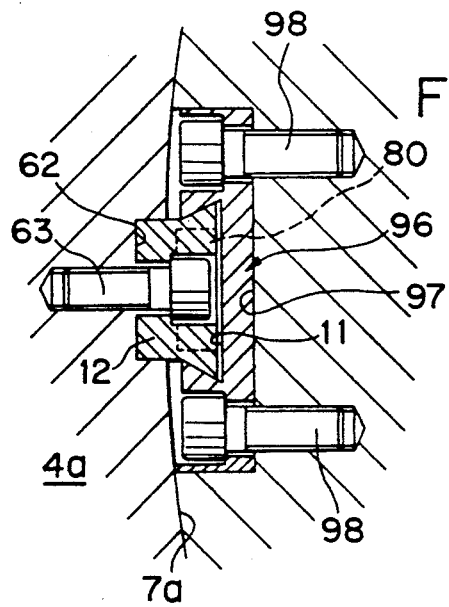
FIG. 20 is an enlarged view in section taken along the line VI—VI in FIG. 15.

FIG. 15 shows yet another embodiment, wherein an upper actuator portion 4a is annular and is removably fixed to an upper platen 6a. An upper mold member 1 is removably fixed to the lower surface 61 of an upper wall of the actuator portion 4a. This portion 4a has a tapered inner peripheral surface 7a which is flared radially outward toward its lower end. As shown in FIGS. 15 and 20, the peripheral surface 7a is formed with a groove 62 having a ridge 12 fixed therein by a bolt or like fastening member 63.

An upper sector portion 3a is fittable in a circumferential groove 7 defined by the inner peripheral surface 7a of the upper actuator portion 4a, a lower surface 7b of upper wall of the portion 4a and the outer periphery 64 of the upper mold member 1. The upper portion 3a has a tapered outer surface 9 slidable in contact with the inner peripheral surface 7a of the upper actuator portion 4a. As seen in FIGS. 15 and 20, the outer surface 9 is formed with a dovetail groove 11 for the ridge 12 to slidably fit in.

Figure 17:
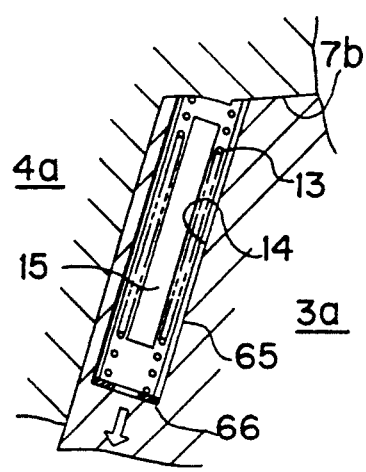
FIG. 17 is an enlarged fragmentary view in section of an upper actuator portion and an upper sector portion.

Each block of the upper sector portion 3a is always pushed downward by a spring member 13, such as a coiled spring, provided on the upper actuator portion 4a. More specifically stated with reference to FIG. 17, each block of the upper sector portion 3a is formed with a blind bore 14. A support rod 15 having the spring member 13 therearound and inserted in the blind bore 14 is pressed against the upper wall lower surface 7b of the upper actuator portion 4a. The axes of the bore 14 and the support rod 15 are disposed at the same angle of inclination as the inner surface 7a of the actuator portion 4a and the outer surface 9 of the upper sector portion 3a. Indicated at 65 is a tube fitted in the bore 14, and at 66 a ring at the bottom of the bore 14.

A lower sector portion 3b has an outer surface 18 with the same inclination as the outer surface 9 of the upper sector portion 3a and is mounted on a lower platen 6b slidably radially thereof. A lower mold member 2 is attached to the lower platen 6b. Indicated at 67 in FIG. 15 is a bolt member fitted in a slide groove 68 in the lower platen 6b for slidably attaching the lower sector portion 3b to the lower platen 6b. The groove 68 is in the form of a dovetail groove, and the bolt member 67 is flanged so as not to slip out of the slide groove 68.

A lower actuator portion 4b is annular and has an inner peripheral surface 23 having the same inclination as the inner peripheral surface 7a of the upper actuator portion 4a. The surface 23 is slidable in contact with the outer surface 18 of the lower sector portion 3b. As seen in FIG. 15, grooves 69 are formed in the inner peripheral surface 23 of the lower actuator portion 4b, and a ridge 70 is fitted in each groove 69 with a fastening member 63. The outer surface 18 of the lower sector member 3b is formed with a dovetail groove 71 for the ridge 70 to slidably fit in. The dovetail groove 71 is formed in a block 73 fitted in a groove 72 formed in the outer surface 18 of the sector portion 3b.

Figure 18:
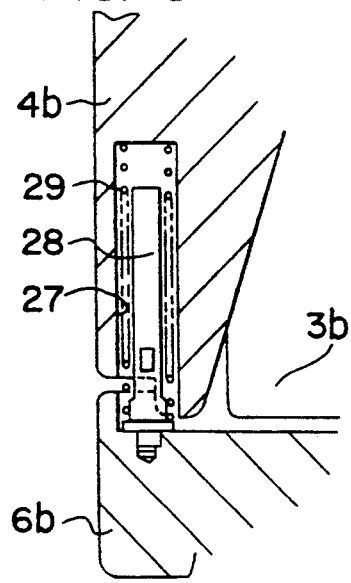
FIG. 18 is an enlarged fragmentary view in section of a lower actuator portion and a lower platen.

With reference to FIG. 18, the lower actuator portion 4b is always pushed upward by spring members 29, such as coiled springs, attached to the lower platen 6b. More specifically, the lower actuator portion 4b has a plurality of vertical blind bores 27 arranged circumferentially thereof. A support rod 28 inserted in each of the bores 27 is secured to the lower platen 6b. The spring member 29 is provided around the rod 28 and inserted in the bore 27.

The mold is provided with connecting means 30 for raising the lower actuator portion 4b with the upper actuator portion 4a when the portion 4a is raised from the state in which the mold is completely closed (i.e., the state shown in FIGS. 15 and 16, (c)).

While the upper actuator portion 4a is raised from the state shown in FIG. 16, (c) to the state shown in FIG. 16, (b) by a predetermined distance H by the rise of the upper platen 6a, the lower actuator portion 4b engaged by hook members 74 is also raised with the rise of the upper actuator portion 4a. When the upper actuator portion 4a thereafter rises further, the lower portion 4b is released from the hook members 74, allowing the upper portion 4a only to rise to the position shown in FIG. 16, (a). The lower actuator portion 4b remains in contact with the tapered surface of the lower sector portion 3b, as held pushed up by the spring members 29. With reference to FIG. 15, the connecting means 30 comprises the hook member 74 which is disposed in a lower end portion 75 of the upper actuator portion 4a radially inwardly of its outer surface 31, an engaging portion 78 disposed in an upper end portion of the lower actuator portion 4b radially inwardly of the outer surface 76 of the portion 4b, a spring member 36 for radially inwardly pushing a hook portion 79 at the forward end of the hook member 74, and a pushing portion 80 provided in the upper sector portion 3a for radially outwardly pushing the hook portion 79.

Figure 19A:
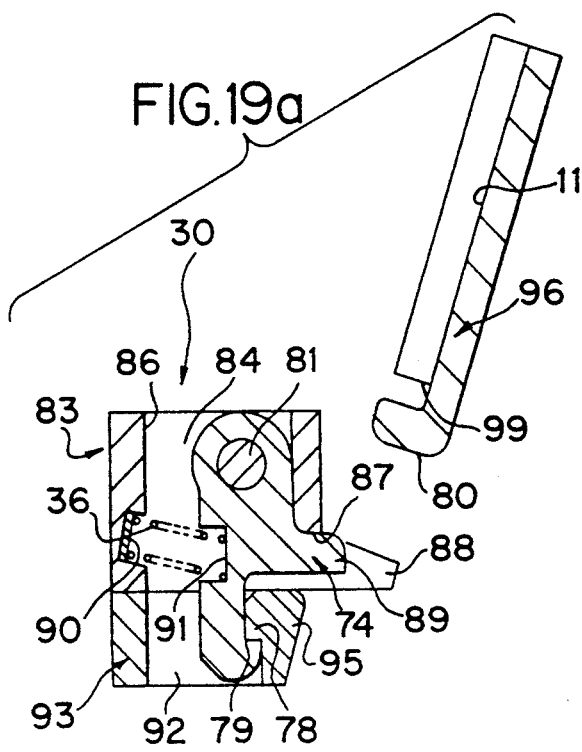
FIGS. 19(a) and 19(b) enlarged fragmentary views in section for illustrating how the mold is opened and closed.
Figure 19B:
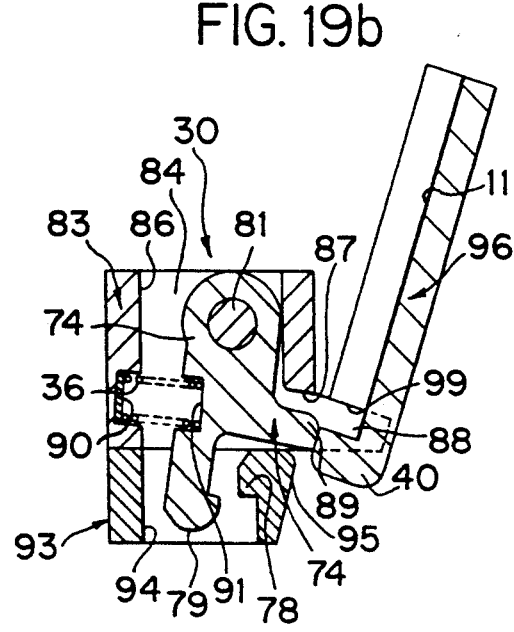
Figure 22:
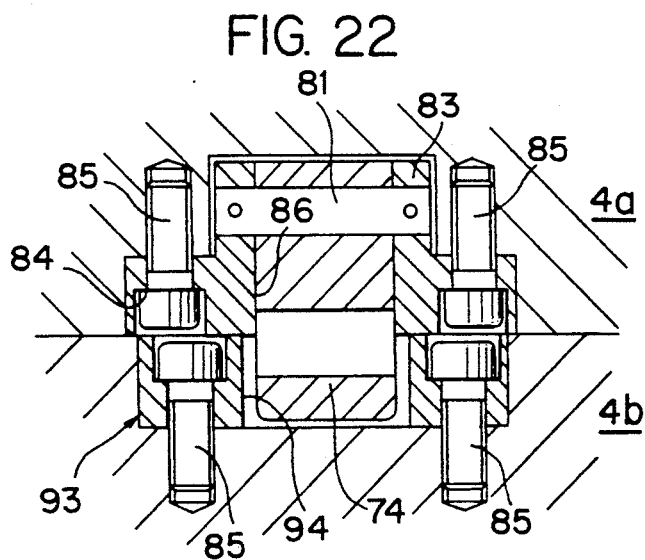
FIG. 22 is an enlarged view in section taken along the line VIII—VIII in FIG. 15.
Figure 23:
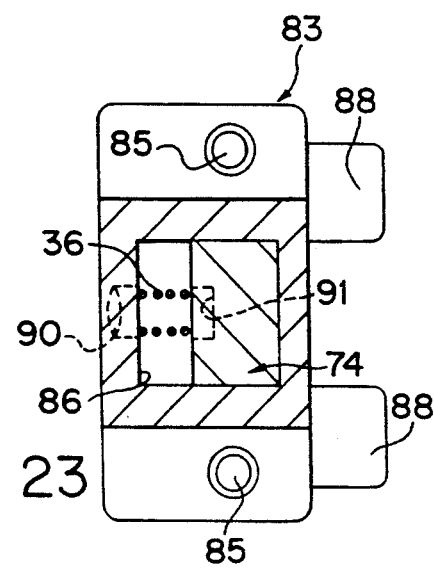
FIG. 23 is an enlarged view in section taken along the line IX—IX in FIG. 15.

The hook member 74 is movably supported by a horizontal pivot 81 provided inside the upper actuator portion 4a and is partly projected (at the hook portion 79) beyond the lower surface 82 of the upper actuator portion 4a. The hook portion 79 is pivotally movable radially of the actuator. The pivot 81 is supported by a support member 83 attached to the upper actuator portion 4a. The support member 83 is fixed in a cavity 84 in the lower surface 82 of the portion 4a by fastening members 85 as seen in FIGS. 19 and 22. The support member 83 has a bore 86 extending therethrough and having the hook member 74 pivotally movably inserted therein. A cutout 87 is formed in the lower end of the inner wall of the support member 83 centrally thereof. As seen in FIG. 23, the inner wall lower end has pieces 88, 88 projecting radially inward. The hook portion 79 is projected through the cavity 84.

The hook member 74 further has a protrusion 89 projecting radially inward and inserted in the cutout 87 of the support member 83. When the hook member 74 is in a vertical position, the protrusion 89 projects through the cutout 87 as shown in FIG. 19, (a).

The outer wall of the support member 83 has a recess 90 formed in its inner surface, while a recess 91 is formed in the outer face of the hook member 74. The spring member 36 is provided between the recesses 90, 91 for pushing the hook portion 79 of the hook member 74 radially inward into engagement with the engaging portion 78.

Figure 21:
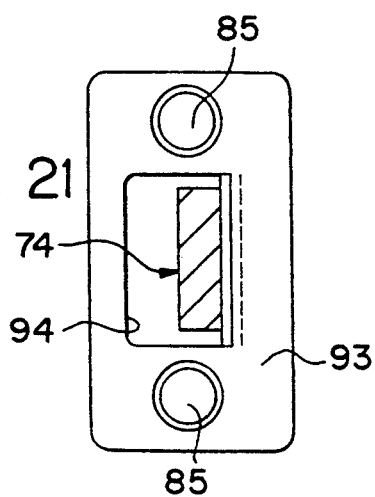
FIG. 21 is an enlarged view in section taken along the line VII—VII in FIG. 15.

The engaging portion 78 is provided on a socket member 93 fitted in a cavity 92 formed in the lower actuator portion 4b. More specifically, the socket member 93 has a generally rectangular bore 94 (see FIG. 21) extending therethrough, and the engaging portion 78 is formed on the inner surface of the inner wall 95 of the member 93. The forward end of the hook member 74 is inserted in the bore 94.

The pushing portion 80 is provided by the lower end of a block 96 having the dovetail groove 11 of the upper sector portion 3a. More specifically stated with reference to FIG. 20, the block 96 is fixed in a groove 97 in the outer surface 9 of the upper sector portion 3a by fastening members 98. An approximately L-shaped piece providing the pushing portion 80 projects from the lower end of the block centrally thereof. When the upper sector portion 3a is pushed down by the spring members 13 with the start of rise of the upper actuator portion 4a to open the mold, the pushing portion 80 pushes the protrusion 89 of the hook member 74 to thereby move the hook portion 79 of the hook member 74 radially outward out of engagement with the engaging portion 78 as shown in FIG. 19, (b). In the state shown in FIG. 19, (b), lower end face 99 of the block 96 is in contact with the projecting pieces 88, 88 of the support member 83, whereby the upper sector portion 3a is prevented from lowering further. Indicated at 100 in FIG. 15 is a stopper fixed to the upper surface 22 of the lower sector portion 3b with a fastening member 101.

To vulcanize a raw tire using the mold, the tire is placed on the lower mold member 2 with the upper platen 6a raised as seen in FIG. 16, (a), and the upper platen 6a is then lowered. In this state, the hook member 74 is pushed at one portion thereof by the pushing portion 80, with the hook portion 79 out of engagement with the engaging portion 78 as shown in FIG. 19, (b). As seen in FIG. 16, (b), the upper sector portion 3a, after coming into contact with the lower sector portion 3b, is pushed by this portion 3b, starting to rise relative to the upper actuator portion 4a. The rise of the upper sector portion 3a relative to the upper actuator portion 4a also raises the block 96 relative thereto, allowing the engagement of the hook portion with the engaging portion as seen in FIG. 19, (a). When the upper actuator portion 4a is lowered by further lowering the upper platen 6a, the lower actuator portion 4b moves down against the force of the spring members 29, slidingly moving the upper sector portion 3a and the lower sector portion 3b radially inward at the same time, whereby the mold is closed completely as seen in FIG. 16, (c). The tire is vulcanized in this completely closed state.

The parting line 41 between the lower surface 21 of the upper sector portion 3a and the upper surface 22 of the lower sector portion 3b is in coincidence with the equator of the tire. When the sector portions 3a, 3b slide along, the parting line 41 moves radially of the mold at the same level as the tire equator. The parting line 41 can of course be positioned off the tire equator. Regardless of the position of the parting line, both the sector portions 3a, 3b move radially inward without upward or downward shift of the parting line 41 but with the line maintained at the same level when the mold is closed.

When the upper platen 6a is raised after vulcanization, the upper actuator portion 4a rises along with the lower actuator portion 4b since the hook portion 79 is in engagement with the engaging portion 78. The upper and lower sector portions 3a, 3b therefore slide along radially outward to open the sector 3. When the upper actuator portion 4a rises a predetermined distance H, this results in the descent of the upper sector portion 3a relative to the upper actuator portion 4a by the distance H, bringing the pushing portion 80 into contact with the protrusion 89 of the hook member 74. With further rise of the upper actuator portion 4a, the pushing member 80 pushes the protrusion 89, releasing the hook portion from the engaging portion as shown in FIG. 19, (II). The lower actuator portion 4b is held pushed up by the spring members 29. Thus, the mold is fully opened with the vulcanized tire remaining therein.

As described above, the vulcanizing mold of the invention is used for vulcanizing tires.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A vulcanizing mold comprising a first mold half, a second mold half, a tread mold sector and a tapered ring disposed radially outwardly of the thread mold sector;
   said first mold half and said second mold half being disposed vertically relative to one another;
   said tapered ring including a first tapered ring half and a second tapered ring half both vertically movable relative to the tread mold sector, a space being provided between said first tapered ring half and said second tapered ring half when the tapered ring halves are vertically separated, the tapered ring halves being vertically movable into engagement with each other, the tapered ring halves each being generally ring shaped and each having a tapered inner face;
   said tread mold sector including a first tread mold sector half and a second tread mold sector half, the first and second mold sector halves each having a tapered outer face, the tapered outer face of the first tread mold sector half being engaged with the tapered inner face of the first tapered ring half and the tapered outer face of the second tread mold sector half being engaged with the tapered inner face of the second tapered ring half, said first tread mold sector half being slidable radially to open and close the tread mold sector with a slide movement in contact with the first tapered ring half in response to a relative vertical movement of the first tapered ring half, said second tread mold sector half being mounted on the second mold half to be slidably and vertically unmovable relative to the second mold, the second tread mold sector half being slidable radially to open and close the tread mold sector without causing a vertical self-displacement relative to the second mold half and with a slide movement in contact with the second tapered ring half in response to a relative vertical movement of the second tapered ring half.

2. The vulcanizing mold as defined in claim 1, further comprising means for pushing the second tapered ring half downward and means for pushing the first tread mold sector half upward, the means for pushing the first tread mold sector half being located between the first tread mold sector half an the first tapered ring half.

3. The vulcanizing mold as defined in claim 2, wherein the means for pushing the first tapered ring half and the means for pushing the second tread mold sector half both comprise elastic members.

4. The vulcanizing mold as defined in claim 1, wherein the first and second tread mold second halves have divided joining faces therebetween which are each formed with one of a positioning projection and indentation.

5. The vulcanizing mold as defined in claim 1, further comprising connecting means for releasably connecting the first tapered ring half and the second tapered ring and for releasing the first and second tapered ring halves from each other for separation when the tapered ring halves are raised a predetermined amount from a mold clamping position at a lower level.

6. The vulcanizing mold as defined in claim 5, wherein the connecting means comprises:
- a hanging member pivotally provided on one of the first and second tapered ring halves and projecting toward the other tapered ring half with an engaging portion formed at a projecting end thereof;
- an engageable portion provided on the other tapered ring half and releasably engageable by the engaging portion when the first and second tapered ring halves are fitted together;
- mean for biasing the hanging member toward a direction in which the engaging portion engages the engageable portion; and
- a release member attached to the second mold half for pivotally moving the hanging members against the means for biasing in order to release the engaging portion from the engageable portion when the release member is moved vertically relative to the hanging member.

7. The vulcanizing mold as defined in claim 5, wherein the connecting means comprises:
- a hook member movably supported by a horizontal pivot on an inside of the first tapered ring half and having a lower end projecting beyond a lower surface of the first tapered ring half;
- an engaging portion provided at an upper end of the second tapered ring half and releasably engageable with a hook portion at a forward end of the hook member when the first tapered ring half is in contact with the second tapered ring half;
- an elastic member for biasing the hook portion of the hook member radially inward to engage the hook portion with the engaging portion when the first tapered ring half is in contact with the second tapered ring half; and
- a pushing portion provided on the first tread mold sector half and movable into contact with a portion of the hook member to push the hook portion thereof radially outward against force of the elastic member and to release the hook member from the engaging portion when the mold is in an open state with the first tapered ring half raised to sightly lower than the first tread mold sector half relative thereto.

8. The vulcanizing mold as defined in claim 1, further comprising means for pushing the second tapered ring half upward and means for pushing the first tread mold sector half downward, the means for pushing the first tread mold sector half being located between the first tread mold sector half and the first tapered ring half.

9. The vulcanizing mold as defined in claim 8, wherein the means for pushing the second tapered ring half and the means or pushing the first tread mold sector half both comprise elastic members.

10. The vulcanizing mold as defined in claim 8, further comprising a stopper for holding the first tread mold sector half to prevent the first tread mold sector half from descending more than a predetermined amount relative to the first tapered ring half.

11. The vulcanizing mold as defined in claim 1, wherein the tapered inner face of the first tapered ring half and the tapered outer face of the first tread mold sector half are tapered with the same inclination, the tapered inner face of the second tapered ring half and the tapered outer face of the second tread mold sector half are tapered with the same inclination, an angle of inclination of the tapered inner face of the first tapered ring half being substantially the same as an angle of inclination of the tapered inner face of the second tapered ring half.

12. The vulcanizing mold as defined in claim 10, wherein the tapered inner face of the first tapered ring half is formed with one of ridges and grooves extending vertically thereon and arranged at a predetermined spacing circumferentially thereof, and the tapered outer face of the first tread mold sector half has the same inclination as the tapered inner face of the first tapered ring half, the tapered outer face oft he first tread mold sector half having one of grooves and ridges which slidably fit by a dovetail joint into the one of ridges and grooves on the tapered inner face of the first tapered ring half.

13. The vulcanizing mold as defined in claim 12, wherein the tapered inner face of the second tapered ring half is tapered with the same inclination as the tapered inner face of the first tapered ring half and formed with one of grooves and ridges extending vertically thereon and arranged at a predetermined spacing circumferentially thereof, and the tapered outer face of the second tread mold sector half has the same inclination as the tapered inner face of the second tapered ring half, the outer face of the second tread mold sector half having one of grooves and ridges which slidably fit by a dovetail joint into the one of ridges and grooves of the second tapered ring half.

* * * * *